US010866079B2

(12) United States Patent
Munder et al.

(10) Patent No.: US 10,866,079 B2
(45) Date of Patent: Dec. 15, 2020

(54) POSITION SENSING DEVICE (71) Applicant: Melexis Technologies NV, Tessenderlo (BE)

(72) Inventors: Gunnar Munder, Erfurt (DE); Peter Teichmann, Erfurt (DE)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 1 day.

(21) Appl. No.: 16/411,351

(22) Filed: May 14, 2019

(65) Prior Publication Data
US 2019/0346249 A1 Nov. 14, 2019

(30) Foreign Application Priority Data
May 14, 2018 (EP) .................. 18172083

(51) Int. Cl.
G01B 7/00 (2006.01)
G01D 5/20 (2006.01)

(52) U.S. Cl.
CPC .......... *G01B 7/003* (2013.01); *G01D 5/2053* (2013.01)

(58) Field of Classification Search
CPC ..................................... G01B 7/003
USPC ..................................... 324/207.17
See application file for complete search history.

(56) References Cited

U.S. PATENT DOCUMENTS 5,886,519 A    3/1999  Masreliez et al.
6,366,078 B1   4/2002  Irle et al.
6,642,711 B2 * 11/2003 Kawate .................. G01B 7/003
                                                    324/207.17
8,427,141 B2   4/2013  Dietmar
9,188,421 B2 * 11/2015 Prussmeier .......... G01D 5/2046
9,207,061 B2 * 12/2015 Yamasaki ............... G16Z 99/00
(Continued)

FOREIGN PATENT DOCUMENTS

DE   10208915 A1   7/2003
EP   0787973 A1    8/1997
EP   0900998 A1    3/1999
(Continued)

OTHER PUBLICATIONS

Extended European Search Report from EP Application No. 18172083.0, dated Oct. 29, 2018.

*Primary Examiner* — Reena Aurora
(74) *Attorney, Agent, or Firm* — Workman Nydegger (57) ABSTRACT A device for position sensing comprises sensing means arranged for producing at least two sensor signals, and a signal construction unit. The signal construction unit comprises selection means for selecting in a serial way one of at least two time-synchronous signals, sampling means for sampling a selected time-synchronous signal at given sampling instants, storage means for storing sampled data representing the selected time-synchronous signal and timing information indicating which of the given sampling instants were used to obtain the sampled data, and processing means for determining at one of the given sampling instants a value for at least one of said time-synchronous signals that was not sampled at the one given sampling instant by performing an interpolation using data values of the at least one time synchronous signal stored in the storage means and obtained at another point in time than the one given sampling instant.

15 Claims, 7 Drawing Sheets (56) References Cited

U.S. PATENT DOCUMENTS 10,161,766 B2 * 12/2018 Liu .......................... H02P 6/16

FOREIGN PATENT DOCUMENTS

| EP | 0908702 A2 | 4/1999 |
|----|------------|--------|
| GB | 2517152 A  | 2/2015 |

* cited by examiner

POSITION SENSING DEVICE

FIELD OF THE INVENTION

The present invention is generally related to the field of position sensing devices.

BACKGROUND OF THE INVENTION

A position sensor is a device that can detect the movement of an object and convert theses into signals suitable for further processing, transmission or control. Position sensors are applied in numerous application fields.

In position sensing applications it may be needed to sense synchronously more than one signal. These signals represent for instance a given position in time or an angle in time. For example, in an inductive positioning application, typically three sensor input signals are employed that represent position information in time. The three sensor signals are next fed to a signal processing device. For time critical applications, e.g. high-speed position sensing, it may be needed to process the three sensor signals in parallel, e.g. to filter, amplify, sample and store them all in parallel for achieving synchronous samples.

Figure 1:
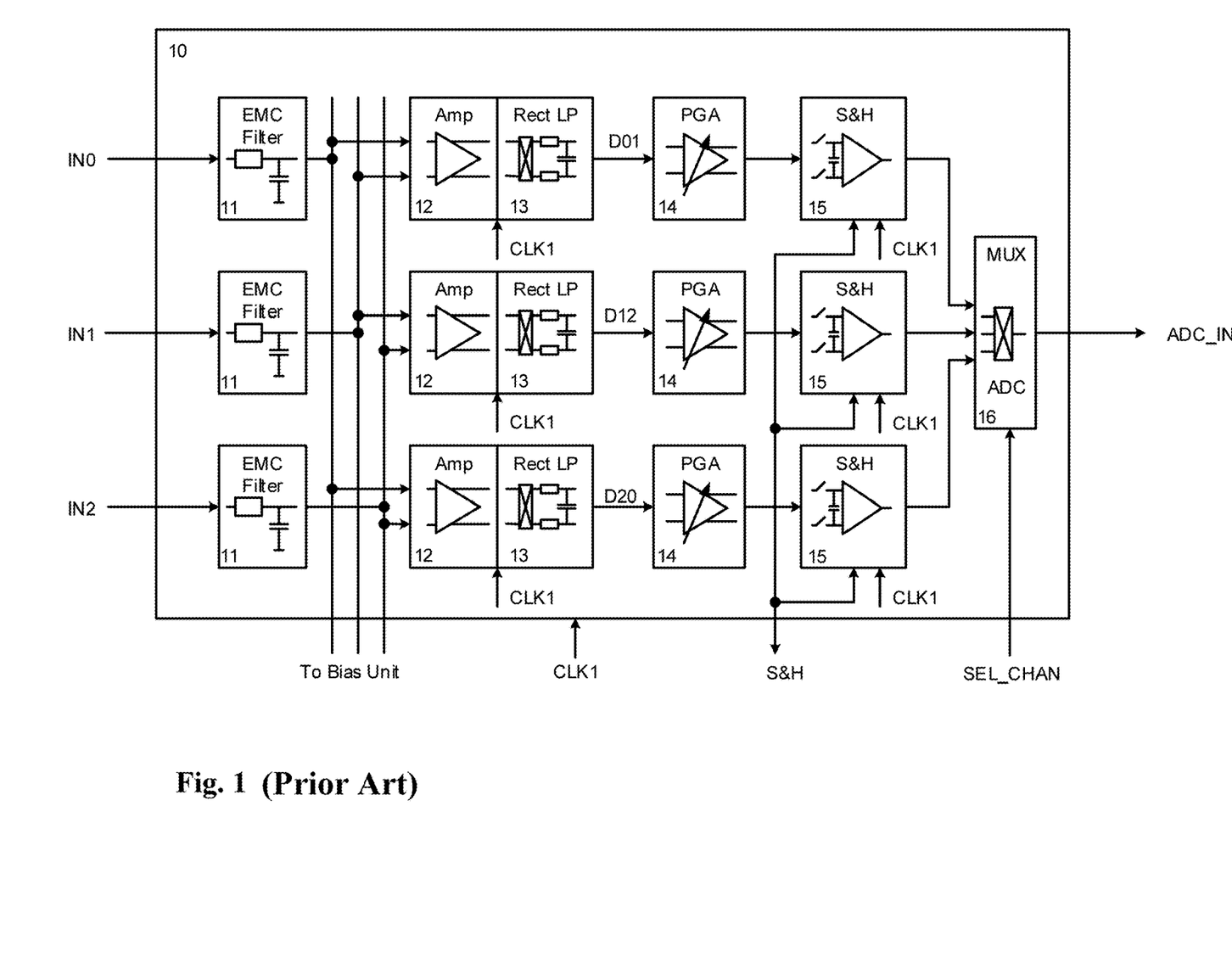
FIG. 1 illustrates a scheme of a device as known in the prior art.

An illustration is provided in FIG. 1, where an analog front end is shown of a position sensing device as known in the art. Three signals IN0, IN1, IN2 coming from three sensors are applied to the analog front end (AFE) block (10) and next passed to an EMC (electromagnetic compatibility) filter (11), which removes disturbances. In the example of FIG. 1 the signals are further processed as differential signals, meaning that a first differential signal amplifier (12) followed by a first differential signal rectifier and low pass filter (13) get as input IN0 and IN1 to derive the difference signal D01=IN0−IN1. This removes common mode and DC elements included in the signals. Similarly, a second differential signal amplifier (12) and second differential signal rectifier and low pass filter (13) get IN1 and IN2 from which is derived D12=IN1−IN2 and a third differential signal amplifier (12), differential signal rectifier and low pass filter (13) get IN2 and IN0 to obtain therefrom D20=IN2−IN0. This means, all differential signals D01, D12 and D20 have been processed in parallel and keep their time relation:

$$D01(t)=IN0(t)-IN1(t)$$

$$D12(t)=IN1(t)-IN2(t)$$

$$D20(t)=IN2(t)-IN0(t)$$

Figure 2:
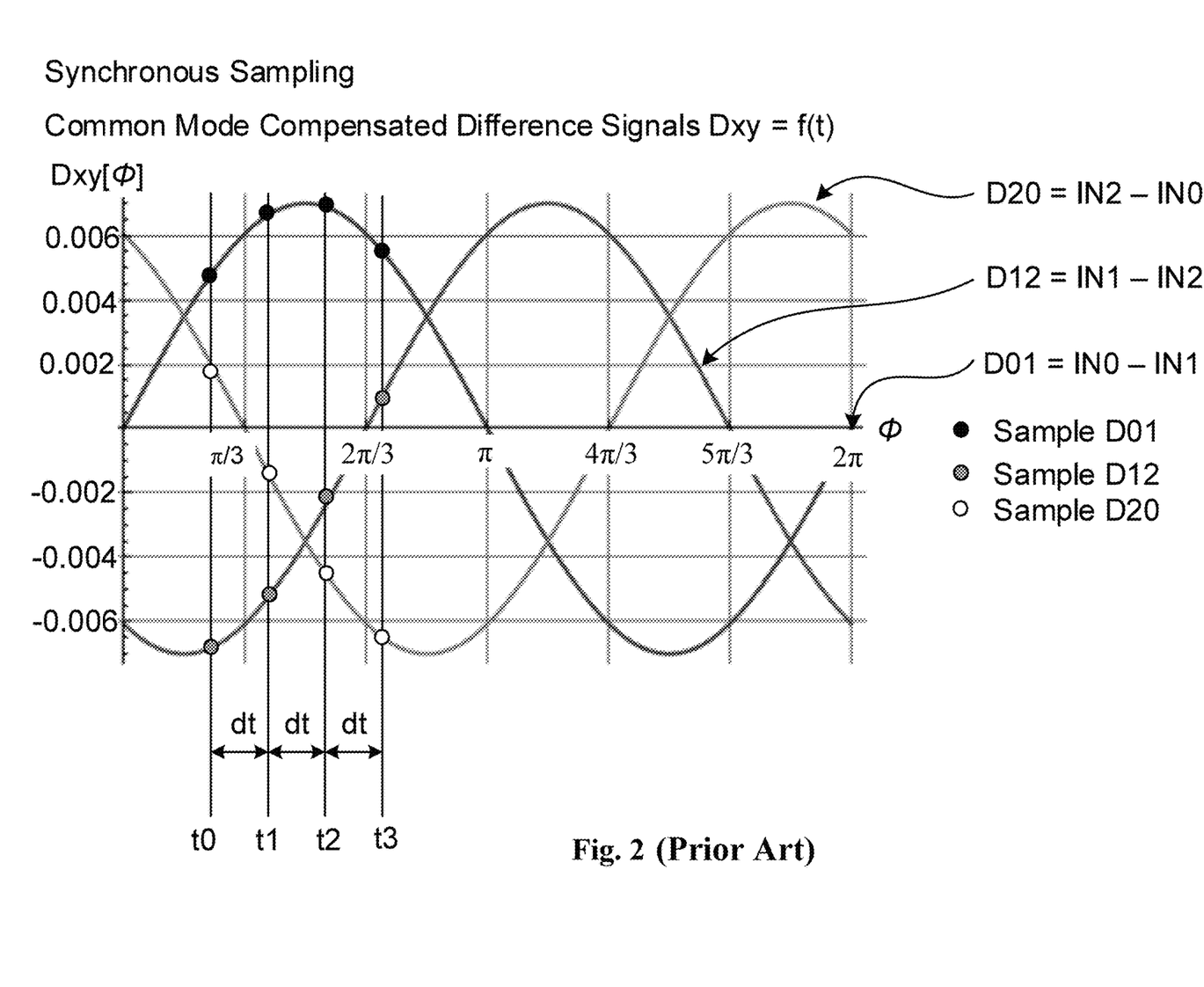
FIG. 2 illustrates the synchronous sampling as applied in prior art solutions.

The differential signals D01, D12, D20 each are given to the programmable gain amplifiers (14) in order to scale them according to a measurement range and fed to sample-and-hold stages (15). The sample and hold stages take samples in time and store the samples. All signals maintain their time relation. The sampled differential signals D01, D12, D20 are further given to a multiplexer (16) and to an ADC, so that the differential signals can be processed further. As illustrated in FIG. 2, the Sample and Hold stages may take samples in a synchronous manner at certain timing intervals dt, for instance at a time t0, t1=t0+dt, t2=t1+dt and t3=t2+dt, deriving samples D01(t0), D12(t0), D20(t0), D01(t1), D12(t1), D20(t1), D01(t2), D12(t2), D20(t2), D01(t3), D12(t3), D20(t3). These samples are next further processed.

The conventional approach as sketched above, however, requires processing hardware in the integrated circuit working fully in parallel, which is not cost efficient. It further requires the hardware to be realized in such a way that errors (e.g. offsets and gain mismatch) between the parallel hardware blocks, which are identical in terms of topology and architecture but differ in their position on the chip, are kept minimal. This creates additional costs.

This problem has already been addressed in the prior art. Publication DE10208915 A1 discloses a method of interpolation of at least two position-dependent, periodic, phase shifted analog signals, which are derived by means of a sigma delta modulator. However, it is shown that the system needs at least two signal delta modulators, which is not cost optimal.

Application EP0787973 relates to a method and an apparatus for computing angle data for encoders and a technique for interpolating detection signals for detecting positions. Also this disclosure shows the use of at least two A/D converters at the same time.

EP0900998 shows an inductive position sensor comprising several sensor signals, which are selectable by a selector and sampled and processed in a serial way by means of only one A/D converter. This solution might not be suitable for high speed position sensing or in safety critical applications.

Therefore, there is a need to reduce this hardware effort and to gain in terms of cost of the integrated circuit and thus of the overall system.

SUMMARY OF THE INVENTION

It is an object of embodiments of the present invention to provide for a position sensing device that requires less hardware blocks to determine position than prior art solutions.

The above objective is accomplished by the solution according to the present invention.

In a first aspect the invention relates to a device for position sensing comprising sensing means arranged for producing at least two sensor signals, and a signal construction unit arranged for obtaining from said at least two sensor signals at least two time-synchronous signals, whereby the signal construction unit comprises
  selection means for selecting in a serial way one of said at least two time-synchronous signals,
  sampling means for sampling said selected time-synchronous signal at one or more given sampling instants,
  storage means for storing sampled data representing said selected time-synchronous signal and timing information indicating which of said given sampling instants were used to obtain said sampled data,
  processing means for determining at one of said given sampling instants a value for at least one of said time-synchronous signals that was not sampled at said one given sampling instant by applying an interpolation scheme using data values of said at least one time synchronous signal stored in said storage means and obtained at another point in time than said one given sampling instant.

The proposed solution indeed allows for a reduction of the amount of required hardware. Due to the serial processing of the samples coming from the various input signals it is now required to perform an interpolation to determine a value for the missing measurements.

In a preferred embodiment the sampling means is arranged for sampling at equidistant sampling times.

Preferably the position sensing device comprises a control unit arranged to control the sampling means. In certain embodiments the control unit is arranged for setting a variable sampling time interval.

The control unit is in embodiments of the invention arranged for steering the selection means.

In a preferred embodiment the processing means is arranged for adapting the interpolation scheme being applied.

In one embodiment said processing means is arranged for performing the interpolation with only data values obtained by sampling.

In another preferred embodiment the interpolation is a weighted sum of the data values. In certain embodiments the weights used in the weighted sum are dependent on the data values.

In an embodiment the interpolation scheme is selected based on data samples from the past.

Advantageously, the time-synchronous signals are periodic signals.

In one embodiment the time-synchronous signals are differential signals.

In another embodiment a gain amplifier is provided between the selection means and the sampling means.

In a preferred specific embodiment the sensing means is arranged for producing exactly three sensor signals.

In another embodiment the sensing means comprises one or more inductive sensors. In one embodiment the device comprises only inductive sensors as sensing means.

In one embodiment the processing means is arranged for calculating a position.

In another aspect the invention relates to a method for performing position sensing comprising
- obtaining at least two time-synchronous signals from at least two sensor signals,
- selecting and sampling in a serial way one of said at least two time-synchronous signals and storing the sampled values along with their sampling instants in a memory,
- calculating from a stored sampled value of one of said time-synchronous signals obtained at a given sampling instant interpolated values of the one or more other time-synchronous signals at said given sampling instant, the calculation being performed at a point in time later than said given sampling instant,
- determining a position at said given sampling instant based on said calculating step.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

As already mentioned above, for high speed applications like position sensing or other time dependent sensing applications, it may be needed to measure and to process more than one signal simultaneously. In order not to lose the real time relation between the various signals, it is needed to process signals in a parallel way. This is related to efforts in the signal processing units, which must be available for each signal and may not be cost efficient.

To save costs it may be worthwhile to consider applying serial signal processing, but such an approach may introduce an error in the determination of a position or an angle related to time. For low speed applications or in "stand still" this may not be a problem, but for high speed sensing applications the error is however not acceptable.

The position sensing device presented in this invention requires a reduced amount of hardware compared to fully parallel implementations as encountered in the prior art, while the time relation can be maintained or at least the deviation can be limited to an acceptable level. A cost efficient realization is obtained by exploiting interpolation in a simple arithmetic unit that performs the required calculations and constructs the signals.

Figure 3:
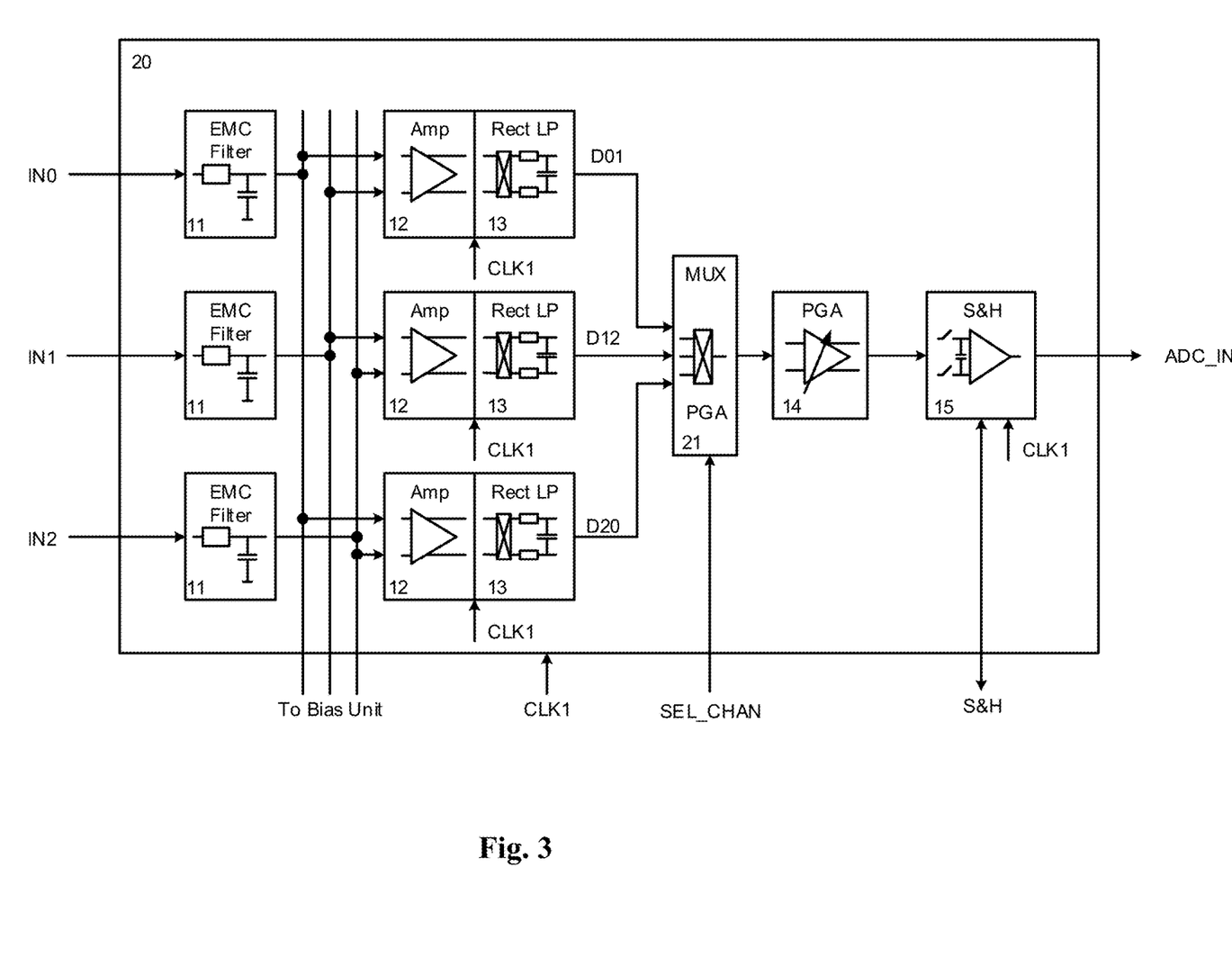
FIG. 3 illustrates a possible implementation of an analog front end of a device according to the invention.

An embodiment of an analog front end of a device according to the present invention is depicted in FIG. 3. The most striking difference with the scheme of FIG. 1, is that now the time dependent signals are fed via a multiplexer (21) to a programmable gain amplifier (14) and to a sample and hold stage (15). As the signal selection now is done before any sample and hold stage is reached, the time relation of the signals is not given anymore. The signals D01, D12, D20 are sampled at different times in a serial way. If the position is calculated from the serial samples only, an error is introduced. This error must be handled in one of the following stages in the signal processing.

It is noted that in FIG. 3 an embodiment is shown wherein differential signals are applied: e.g. IN0 and IN1 are provided to a differential amplifier (12). The skilled person will readily recognize that in other embodiments single ended signals may be applied. In such embodiments only one signal, e.g. IN0, is processed by the following stages.

In certain embodiments the signals are periodic. A periodic signal completes a pattern within a measurable time frame (a period) and repeats the pattern over identical subsequent periods. Advantageously, they have a sine wave shape. In other embodiments the signals are not periodic.

The principle applied in the present invention to account for the serial sampling of the various input signals is explained with reference to FIG. 4. Assume the sample and hold stage generates samples at a given fixed timing interval dt, for instance at times t0, t1, t2, t3 and t4 as shown in the figure.

At time t2 for instance, a sample D01(t2) is taken of one of the signals. Because of the serial nature of sampling, there are no sample values available at time instant t2 for the other two signals D20 and D12. Signal values $D20i(t2)$ and $D12i(t2)$ must be obtained by interpolation of other measurements (i.e. other samples). As the interpolation may also need sample values obtained at a time instant later than t2, $D20i(t2)$ and $D12i(t2)$ can only be calculated at time t4, when the sample values taken at t0, t1, t3, and t4 are available. Arrows in FIG. 4 indicate which samples are used in the calculation for determining $D20i(t2)$ and $D12i(t2)$, respectively.

Figure 4:
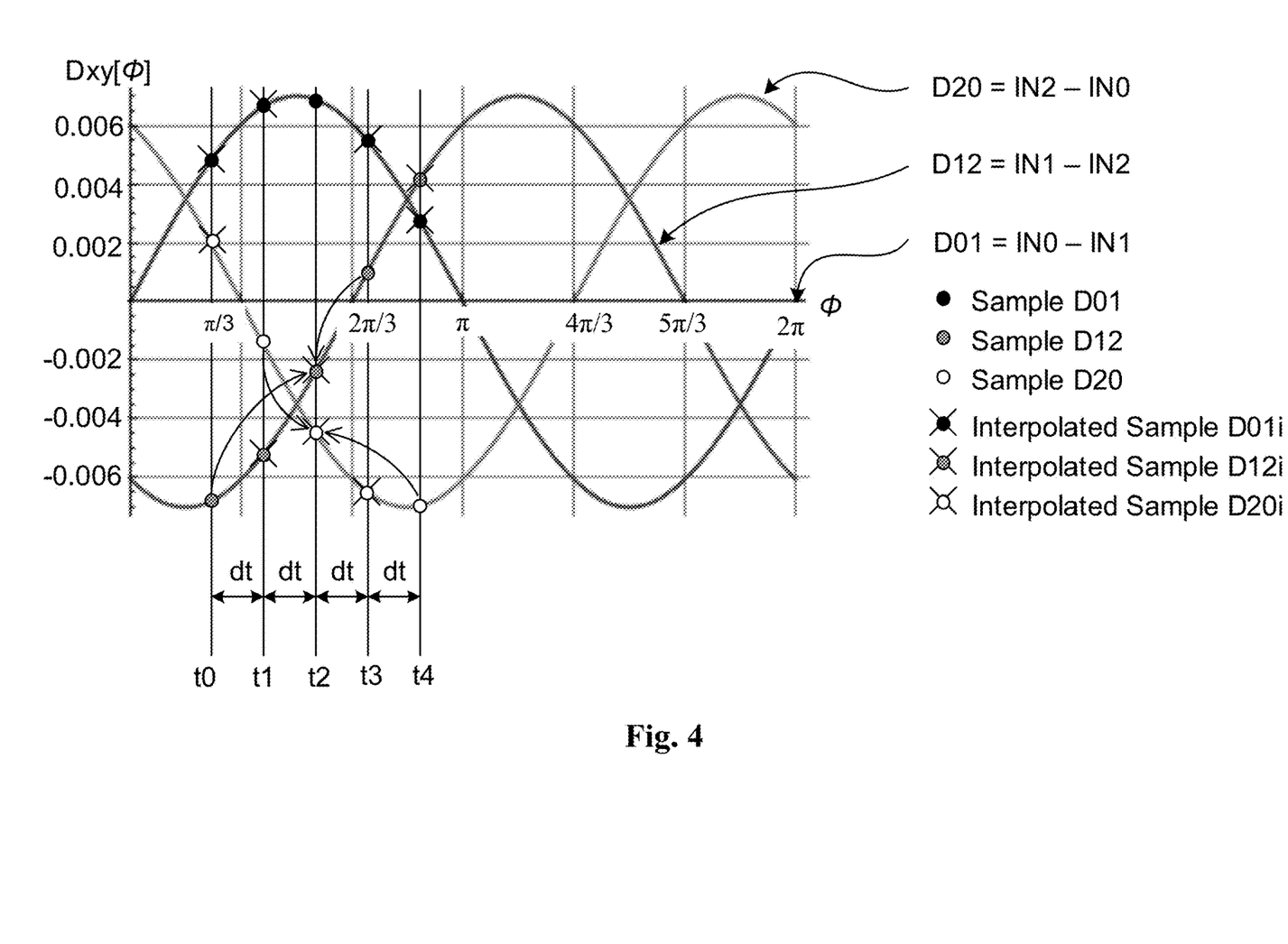
FIG. 4 illustrates the signal sampling and signal construction as applied in the present invention.

In the example of FIG. 4 the samples used for calculating the interpolated samples are all measured samples. In other embodiments the interpolated samples may be calculated from measured samples and other interpolated samples, or, for some of the interpolated samples, only from other interpolated samples.

Numerous interpolation methods are available for calculating the missing data values. In certain embodiments a simple linear interpolation can be applied. In other embodiments a quadratic interpolation method can be used or any other interpolation method to generate at a later time missing data values for time instant tn by exploiting measured sample values or data values obtained by interpolation. Characteristic of the approach adopted in the present invention is that at tn a real measured sample $Dxy(tn)$ is available, while the other samples $Dxyi(tn)$ are interpolated at a later time.

The interpolation method is preferably chosen, so that any error related to the interpolation can be kept small. In order to achieve that, the sensor behaviour is characterized, different interpolation methods are applied, results are compared, so that a preferred interpolation method might be chosen for a given sensor application.

In one embodiment the applied interpolation method is fixed during manufacturing. In other embodiments the interpolation scheme to be applied can be programmed during end of line, for example based on one or more sensor characteristics. In alternative embodiments the interpolation scheme may be selected based on the data samples from the past. The data samples from the past, e.g. tn−x, tn−4, tn−3, can then be compared with each other for each signal. Depending on the signal differences for the data samples of each signal, a linear or a quadratic or any other interpolation method can be applied in order to derive interpolated data samples for tn−2 at sampling time tn in order to keep the error related to the interpolation small.

In an advantageous embodiment an interpolation is performed using a weighting of a number of samples, e.g. as follows:

$D01(tn)$ real sampled, no interpolation needed $$D12i(tn) = \tfrac{2}{3} \times D12(tn-1) + \tfrac{1}{3} \times D12(tn+2)$$

$$D20i(tn) = \tfrac{1}{3} \times D20(tn-2) + \tfrac{2}{3} \times D20(tn+1)$$

In this case real measured samples $Dxy(tn-2, tn-1, tn+1, tn+2)$ are used for the interpolation.

The time interval between samples may be equidistant in certain embodiments. An example of this is found in FIG. 4, where there is a fixed time distance dt between consecutive samples. The error introduced by applying the interpolation scheme is only related to timing. This means the sensing device (60) might deliver delayed sensor information with a delay dt. As every sensor has an inherent intrinsic delay time (i.e. the time required for performing signal processing), this delay dt can be taken into account.

It is possible to use other sampling schemes/ADC conversion cycles, for instance:
- for sensing principles that require the measurement of more or less than three signals
- for sensing principles that can tolerate a reduced accuracy for at least one of the signals, those signals with reduced accuracy requirements could be measured less frequent
- in applications with multiple sensing channels which are re-using the same ADC
- to employ the ADC also for other purposes not related to the main sensing principle.

Depending on the sampling scheme/ADC conversion cycle, the weighted average can have also other ratios, e.g. a ratio 2:1 or 3:1.

In other embodiments the real measured samples can be taken in sequences with a certain periodicity. E.g. at t0 sample D01 is taken, at t1 sample D12 is taken, at t2 sample D20 is taken, at t3 sample D01 is taken again. However, in other embodiments it is also possible to measure at t0, t1, t2 always sample D01, at t3, t4, t5 always sample D12 and so on. It is also possible to vary the order in which the samples are taken, for instance to measure at t0, t1, t2 the samples D01, D12, D20, and then at t3, t4, t5 the samples D12, D20, D01, and so on. This may be helpful, if interferences between subsequent samples cannot be avoided. The samples can in certain embodiments even be taken in a pseudorandom fashion. In fact, any sequence and periodicity can be considered in order to allow an interpolation with minimal errors compared to a parallel signal processing.

In a further embodiment the sampling time interval dt is varied dependent on the real measured samples Dxy(t) and interpolated samples Dxyi(t). If compared to previously measured or calculated samples Dxy(tn−1), Dxyi(tn−1), Dxy(tn−2), Dxyi(tn−2), samples Dxy(tn), Dxyi(tn) show a variation bigger or lower than for instance given thresholds, the time dt is varied to lower or bigger values, respectively.

Figure 5:
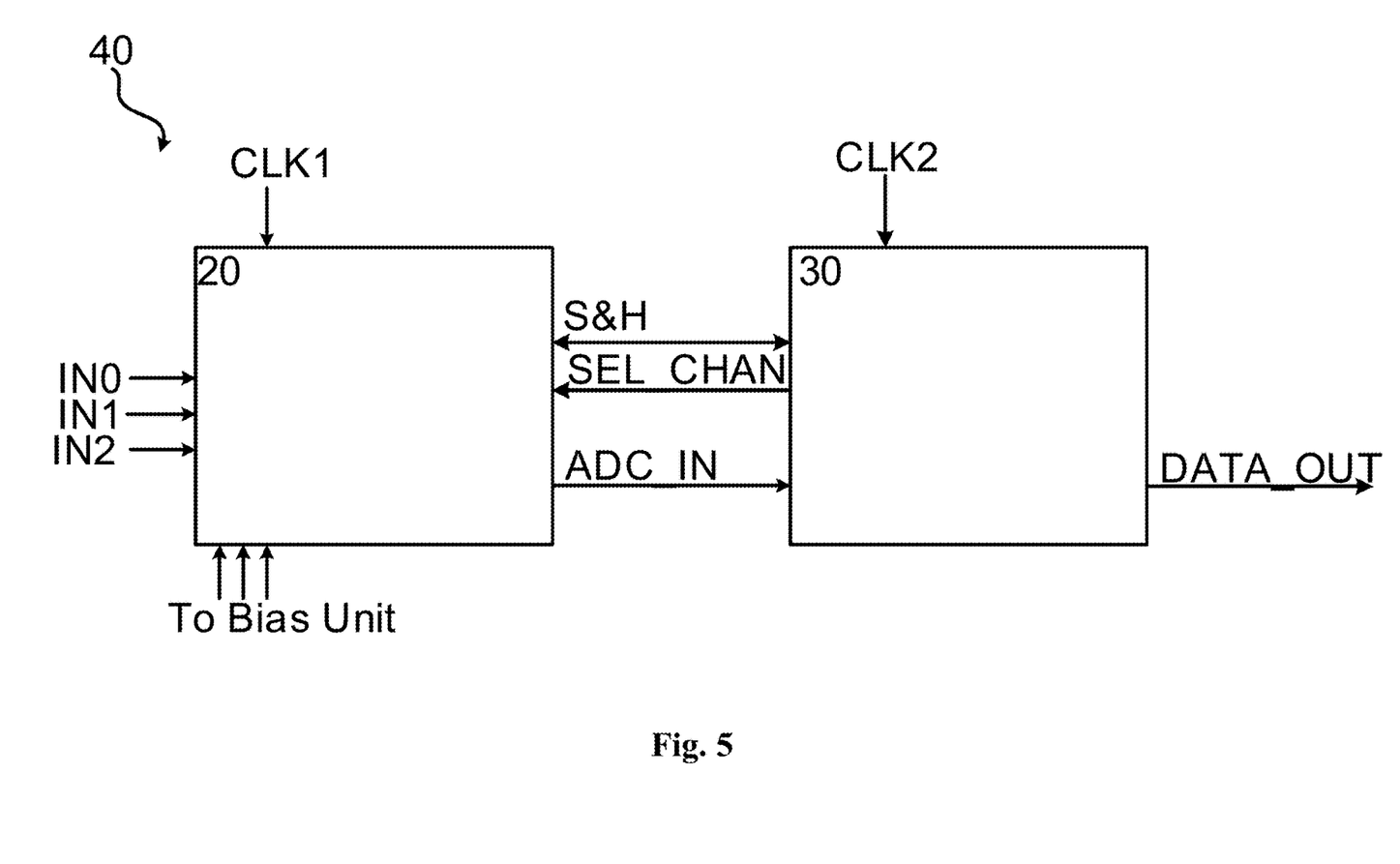
FIG. 5 illustrates a high level scheme of a signal construction unit according to the invention.

A block scheme of a device according to the invention is shown in FIG. 5. The signal construction unit comprises apart from an analog front end (20) also a data processing unit (30). As already shown in FIG. 3, the analog front end (20) is arranged to receive at least two time-synchronous signals.

Figure 6:
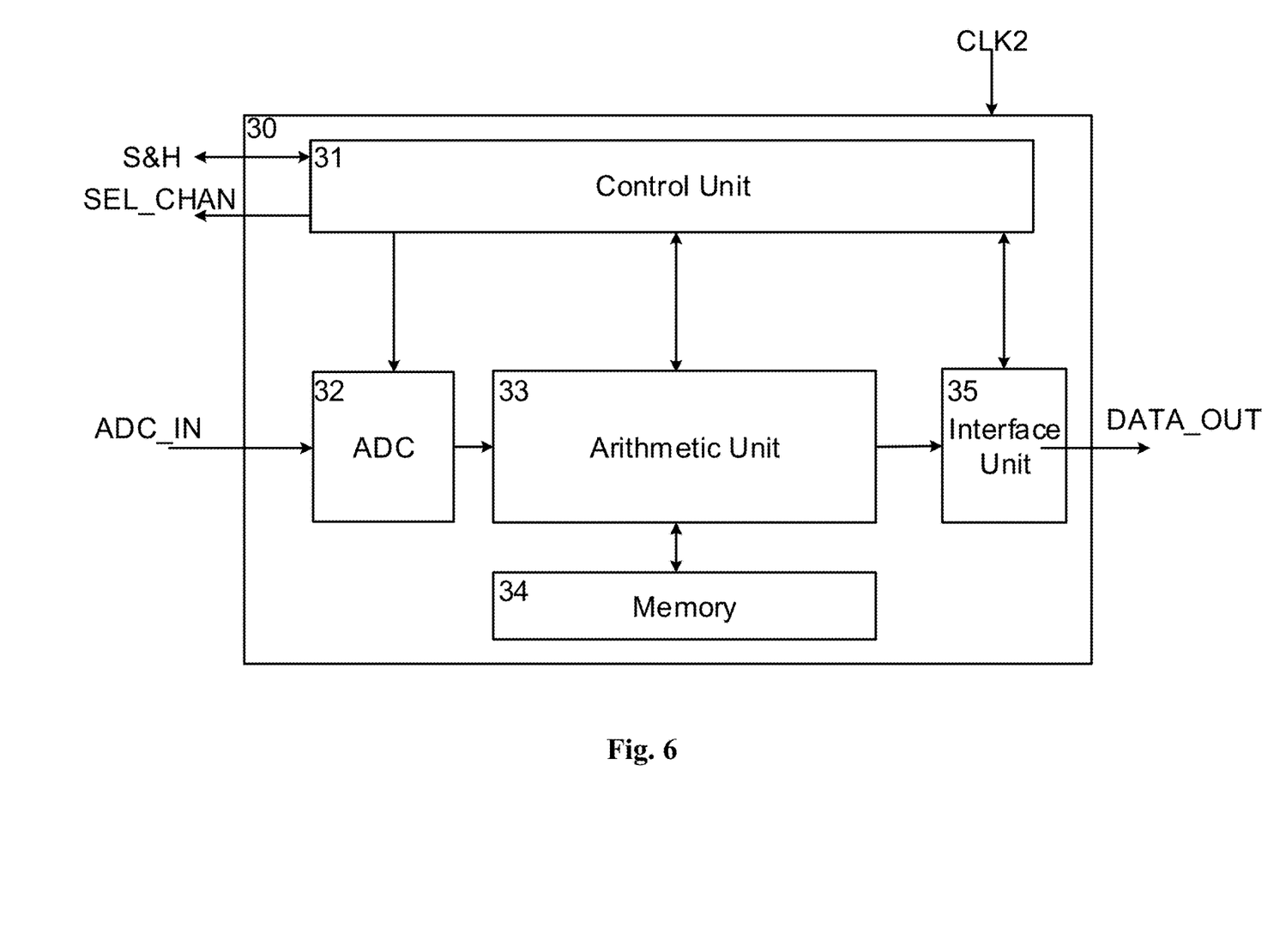
FIG. 6 illustrates an embodiment of a data processing unit of the device according to the invention.

An embodiment of such a data processing unit is illustrated in FIG. 6. The control unit (31) is arranged to trigger (e.g. via signal S&H) the sample and hold stage of the analog front end to take samples at given times. The control unit may in certain embodiments be capable of varying and adjusting the sample timing interval dt as previously described.

In other embodiments the sample and hold stage takes in a continuous way samples every dt and gives just a "ready information" to the control unit, indicating that a sample has been taken. The value dt may in one embodiment be programmable in the control unit for a given application.

Another task to be performed by the control unit (31) is to inform the multiplexer (21) in the analog front end by means of a signal SEL CHAN which input signal is to be selected.

The analog-to-digital converter (32) receives the sampled analog signal (ADC_IN) outputted by the analog front end and converts this signal into a digital representation. The arithmetic unit (33) receives the resulting data stream of samples coming from the ADC (32). The data stream contains actually measured samples Dxy(tn) of the signals fed to the sample and hold stage, e.g. D01, D12, D20. The sample values are stored in a memory (34). This memory (34) can be of any kind, e.g. registers or a RAM.

While the arithmetic unit (33) receives the data stream of samples, the control unit (31) provides to the arithmetic unit information to which signal the respective samples provided by the ADC (32) belong (e.g. D01, D12, D20), so that the arithmetic unit (33) is always aware of both the sample value itself and the timing information of the sample. Sample and timing information are stored in a memory (34) temporarily.

With the available samples and their timing information as kept in the memory, the arithmetic unit is now capable of performing an interpolation, whereby for each time instant tn, sample values Dxy(tn) or Dxyi(tn) are determined (at a point in time a bit later than tn), just as they would have been sampled in a synchronous way according to FIG. 4. The effort to achieve the same result has so been done at lower cost.

In a preferred embodiment the arithmetic unit is capable of adapting at run time the interpolation scheme that is being applied. For that purpose real measured as well as interpolated samples are stored in a memory (34). Samples of e.g. D20(tn) (real measured) can be compared with D20i(tn−1) (interpolated), D20i(tn−2) (interpolated), D20((tn−3) (real measured), . . . by the arithmetic unit (33). Similarly e.g. D01 and D12 might be handled. Based on the differences of samples in time, e.g.:

$E20(tn)=D20(tn)-D20i(tn-1)$, $E20(tn-1)=D20i(tn-1)-D20i(tn-2)$, $E20(tn-2)=D20i(tn-2)-D20(tn-3)$ and $Em20(tn)=D20(tn)-D20(tn-3)$, the arithmetic unit may apply e.g. a linear interpolation method or a quadratic interpolation method or any other interpolation method.

In one embodiment the arithmetic unit selects the interpolation method by interpreting the differences of samples over time. A trigger for moving from one interpolation scheme to another can for instance be based on a threshold of the differences of samples, e.g. a threshold on Exy, Emxy. Parameters for the interpolation method to be used may be stored during an end of line calibration in a non-volatile memory, e.g. EEPROM (69).

The arithmetic unit is further arranged to calculate out of the available real samples Dxy(tn) and the interpolated samples Dxyi(tn) the required quantities, e.g. a position or an angle in time, and to provide this information to an interface unit (35) for data output.

Figure 7:
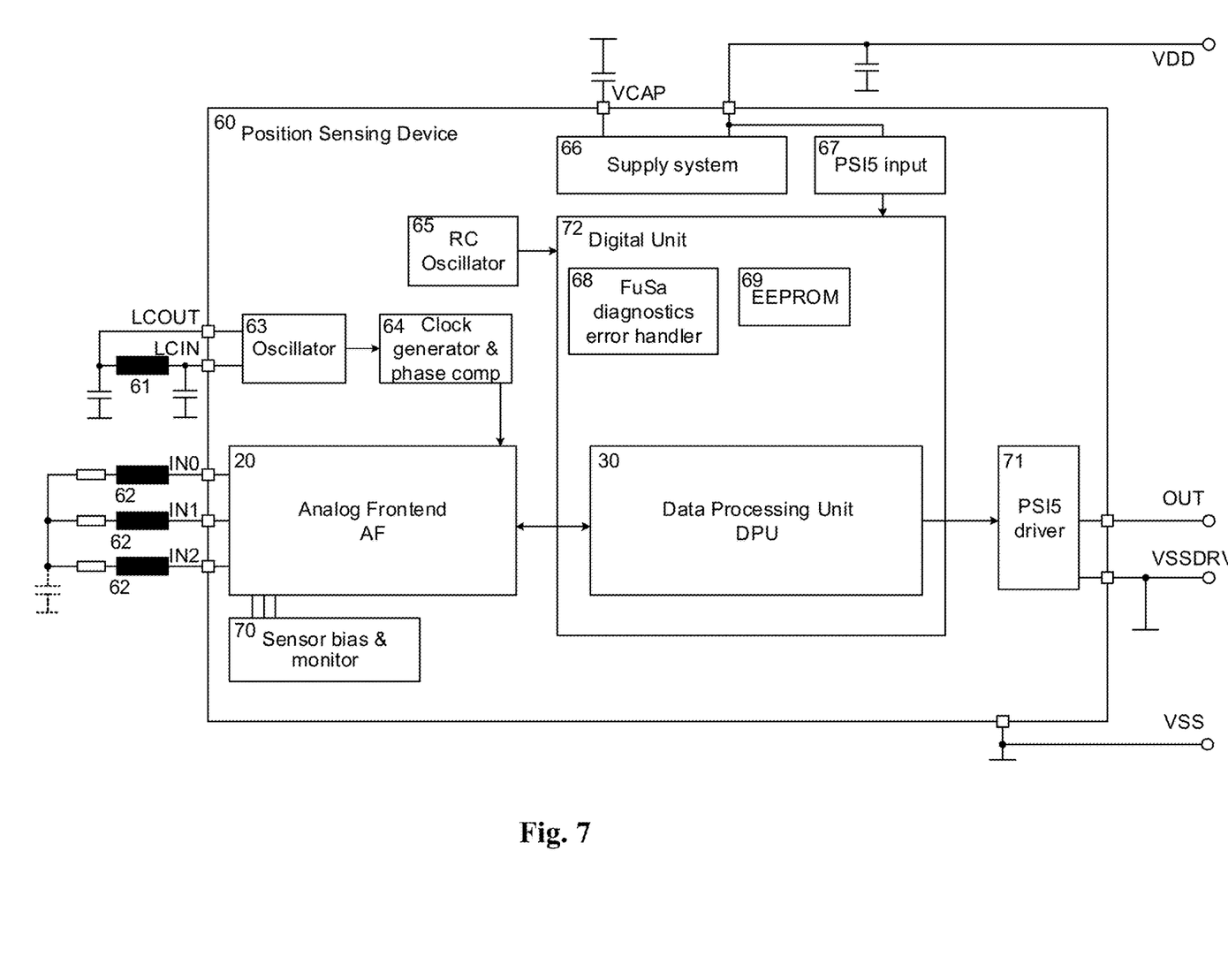
FIG. 7 illustrates a position sensing device comprising the signals construction device of the invention.

FIG. 7 illustrates a possible implementation of a position sensing device according to the present invention. The position sensing device can for instance be realized as an Integrated Circuit (IC).

In the set-up of FIG. 7 a field coil (61) provides a changing magnetic field, which is received by sensing coils (62). The coils can be individual coils or can be combined into a single sensor or can be coil arrangements on a printed circuit board or can be constructed to obtain three individual signals IN0, IN1, IN2 which have a relation in dependence to a position of an object. This was already described for example in U.S. Pat. No. 6,366,078 B1. The applied signals IN0, IN1, IN2 and their relation to each other, may for example provide information about a position or an angle of a special shaped body (not described further here and not shown in any figure). The signal constructing device (40) with analog frontend AF (20) and data processing unit DPU (30) receives the signals from the sensors and processes them as previously described.

A LC oscillator (63) provides the changing magnetic field to the field coil (61). Its clock reference is given to a clock generator (64) and is used in the analog frontend AF (20). A sensor bias & monitor (70) provides a DC operating point for the components of the analog frontend (20) and the sensor coils (62). A supply system (66), comprising for instance a voltage regulator, creates all internal supply voltages and references for the integrated circuit.

Via one pin of the supply system, which for instance can be a positive voltage supply VDD, also a serial data stream can be provided to a digital unit (72). In one embodiment the input data stream can adopt a PSI5 standard under the use of a PSI5 Input (67).

The data input stream can be any type of data, for instance calibration data. Calibration data can for instance comprise parameters, e.g. a parameter dt or a weighted average parameter for the interpolation method or parameter indicative of the interpolation scheme to be applied as previously described. These parameters may possibly be stored in a non-volatile memory, e.g. an EEPROM (69).

The digital unit (72) comprise in certain embodiments also a functional safety diagnostics and error handler (68) to observe all units and compare it towards e.g. thresholds or e.g. data consistency. In case of deviations, errors might be flagged and handled.

In one embodiment the functional safety diagnostics and error handler (68) is capable of comparing the interpolated data samples Dxyi(tn, tn−1, tn+1) among each other or expected values or towards real sampled values Dxy(t). In case of unexpected deviations, the functional safety diagnostics and error handler (68) may start an error handling or at least provide error information towards the data processing unit (30), to reflect that error information in a data stream is to be given out.

Outputting data is done via a driver, e.g. a PSI5 driver, if the data stream follows a PSI5 standard.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A device for position sensing comprising:
sensing means arranged for producing at least two sensor signals,
a signal construction unit arranged for obtaining from said at least two sensor signals at least two time-synchronous signals and comprising:
selection means for selecting in a serial way one of said at least two time-synchronous signals,
sampling means for sampling said selected time-synchronous signal at given sampling instants,
storage means for storing sampled data representing said selected time-synchronous signal and timing information indicating which of said given sampling instants were used to obtain said sampled data,
processing means for determining at one of said given sampling instants a value for at least one of said time-synchronous signals that was not sampled at said one given sampling instant by applying an interpolation scheme using data values of said at least one time synchronous signal stored in said storage means and obtained at another point in time than said one given sampling instant.

2. The device as in claim 1, wherein said sampling means is arranged for sampling at equidistant sampling times.

3. The device as in claim 1, comprising a control unit arranged to control said sampling means.

4. The device as in claim 3, wherein said control unit is arranged for setting a variable sampling time interval.

5. The device as in claim 1, wherein said control unit is arranged for steering said selection means.

6. The device as in claim 1, wherein said processing means is arranged for adapting said interpolation scheme being applied.

7. The device as in claim 1, wherein said processing means is arranged for performing said interpolation scheme with only data values obtained by sampling.

8. The device as in claim 1, wherein said interpolation scheme is a weighted sum of said data values.

9. The device as in claim 8, wherein weights used in said weighted sum are dependent on said data values.

10. The device as in claim 1, wherein said time-synchronous signals are periodic signals.

11. The device as in claim 1, wherein said time-synchronous signals are differential signals.

12. The device as in claim 1, with said sensing means being arranged for producing exactly three sensor signals.

13. The device as in claim 1, wherein said processing means is arranged for calculation a position.

14. The device as in claim 1, wherein said sensing means are inductive sensing means.

15. A method for performing position sensing comprising:
obtaining at least two time-synchronous signals from at least two sensor signals,
selecting and sampling in a serial way one of said at least two time-synchronous signals and storing the sampled values along with their sampling instants in a memory,
calculating from a stored sampled value of one of said time-synchronous signals obtained at a given sampling instant interpolated values of the one or more other time-synchronous signals at said given sampling instant, the calculation being performed at a point in time later than said given sampling instant, determining a position at said given sampling instant based on said calculating step.

\* \* \* \* \*